(12) United States Patent
Chalemin et al.

(10) Patent No.: US 8,140,890 B2
(45) Date of Patent: Mar. 20, 2012

(54) RELOCATING BAD BLOCK RELOCATION (BBR) DIRECTORY UPON ENCOUNTERING PHYSICAL MEDIA DEFECT ON A DISK

(75) Inventors: Glen Edmond Chalemin, Austin, TX (US); Gaurav Batra, Austin, TX (US); Anil Kumar Kaniveedu Damodaran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 12/648,708

(22) Filed: Dec. 29, 2009

(65) Prior Publication Data

US 2011/0161731 A1  Jun. 30, 2011

(51) Int. Cl.
*G06F 11/00* (2006.01)
(52) U.S. Cl. .......................... 714/5.1; 711/100
(58) Field of Classification Search .................. 714/5
See application file for complete search history.

(56) References Cited

U.S. PATENT DOCUMENTS

| | | | | |
|---|---|---|---|---|
| 5,129,088 A | * | 7/1992 | Auslander et al. | 711/1 |
| 5,897,661 A | * | 4/1999 | Baranovsky et al. | 711/170 |
| 6,247,152 B1 | | 6/2001 | Russell | |
| 6,327,679 B1 | | 12/2001 | Russell | |
| 6,332,204 B1 | | 12/2001 | Russell | |
| 6,427,215 B2 | * | 7/2002 | Rafanello et al. | 714/710 |
| 6,523,047 B1 | * | 2/2003 | Rafanello et al. | 711/100 |
| 7,050,252 B1 | * | 5/2006 | Vallis | 360/53 |
| 2005/0044454 A1 | * | 2/2005 | Moshayedi | 714/54 |
| 2005/0128830 A1 | * | 6/2005 | Nishihara et al. | 365/200 |
| 2005/0210214 A1 | * | 9/2005 | Takase et al. | 711/165 |
| 2007/0174718 A1 | * | 7/2007 | Fouquet-Lapar | 714/42 |
| 2009/0049351 A1 | * | 2/2009 | Norrod et al. | 714/723 |
| 2010/0251044 A1 | * | 9/2010 | Khatri et al. | 714/723 |

* cited by examiner

*Primary Examiner* — Scott Baderman
*Assistant Examiner* — Kamini Patel
(74) *Attorney, Agent, or Firm* — Joscelyn Cockburn

(57) ABSTRACT

Apparatus, method and program product for relocating Bad Block Relocation Directory (BBRD) on a disk storage pre-allocate a number of areas for BBRD in different locations of the disk storage. The locations for the BBRD are calculated based upon the size of the disk and BBRD count. If the update of BBRD fails due to defective media at the location to be updated, that location is abandon and the next pre-allocated location is used. A copy of the BBRD is stored in RAM and maintained by the kernel. By so doing, when a bad block in the BBRD is detected the kernel causes the BBRD to be written in a good one of the locations reserved for BBRD. When the number of alternate BBRD locations used hits a pre-defined threshold, this indicates a situation where many sections of the disk are going bad and the disk needs replacement. If all BBRD locations are used, the disk is presumed bad and all future I/O activities to the disk is suspended. An administrator may be notified that the disk is going bad and needs to be replaced.

20 Claims, 6 Drawing Sheets

RELOCATING BAD BLOCK RELOCATION (BBR) DIRECTORY UPON ENCOUNTERING PHYSICAL MEDIA DEFECT ON A DISK

BACKGROUND OF THE INVENTION

1. Field of the Invention

The present invention, in general, relates to error handling and recovery for disk storage media and in particular to error recovery due to physical defects of the storage media.

2. Description of the Related Art

Disk storage devices are used to store data in computer systems. The majority of contemporary disk storage includes some type of mechanism for handling error conditions associated with data recordings on the disk. One type of error condition occurs when disk media in a block is deemed to be corrupted. A mechanism termed Bad Block Relocation (hereafter BBR) is used to relocate the bad block to a reserved replacement sector on the disk. This is achieved by maintaining a relocation map called BBR Directory (hereafter BBRD). This map pairs locations; so when the disk block in one location is deemed defective it is removed to the paired location.

This approach works well so long as the block that is being relocated does not contain the BBRD. If it does contain the BBRD, the disk is deemed defective and future input/output (I/0) activities with the disk is terminated. This is done by marking the disk completely bad, thereby avoiding any future I/Os to it until corrective action is taken. This approach has several drawbacks which makes it unacceptable. For example, it is possible that the rest of the disk is in good state except for the newly detected bad block or blocks. If this is the case, marking the disk completely bad is wasteful. In addition, corrective action usually requires migrating data from the allegedly defective disk to a different disk which leads to considerable down time.

In view of the above, it would be desirable, therefore, to provide a mechanism that relocates BBRD due to error associated with defect of the physical media. It would also, be desirable to provide a mechanism that marks the disk bad only if the entire disk or most of it is deemed defective and not when only part of it is.

SUMMARY OF THE INVENTION

The present invention provides a mechanism which relocates BBRD itself to another location on the disk, if a bad block is detected in it. In particular, the system to which the disk drive is connected pre-allocates some predetermined number of areas for BBRDs in different locations of a disk. The locations reserved for BBRDs are calculated using an algorithm and the size of the disk. Because of the way in which the locations for BBRD are determined, a record of the locations does not have to be maintained on the disk. A record of the BBRD is maintained in RAM by the kernel or operating system. The BBRD may span or occupy one or more blocks or sectors of the disk. When a bad block is detected within the BBRD, the entire BBRD is relocated to another one of the reserved locations. As a consequence, failing the entire disk is avoided, when a bad block is encountered in the BBRD. A pre defined threshold, based on use of a pre defined number of locations reserved for BBR, is set. When the number of locations, reserved for BBRD, used reach the pre defined threshold, this indicates a situation that many sections of the disk is going bad and the disk needs replacement. As a consequence, the disk is marked bad and all I/Os to the disk is stopped. The administrator or operator may be notified.

The above as well as additional features and advantages of the present invention will become apparent in the following detailed written description.

BRIEF DESCRIPTION OF THE DRAWINGS

FIG. 3, including

FIG. 6, including

DETAILED DESCRIPTION OF AN EMBODIMENT

Figure 1:
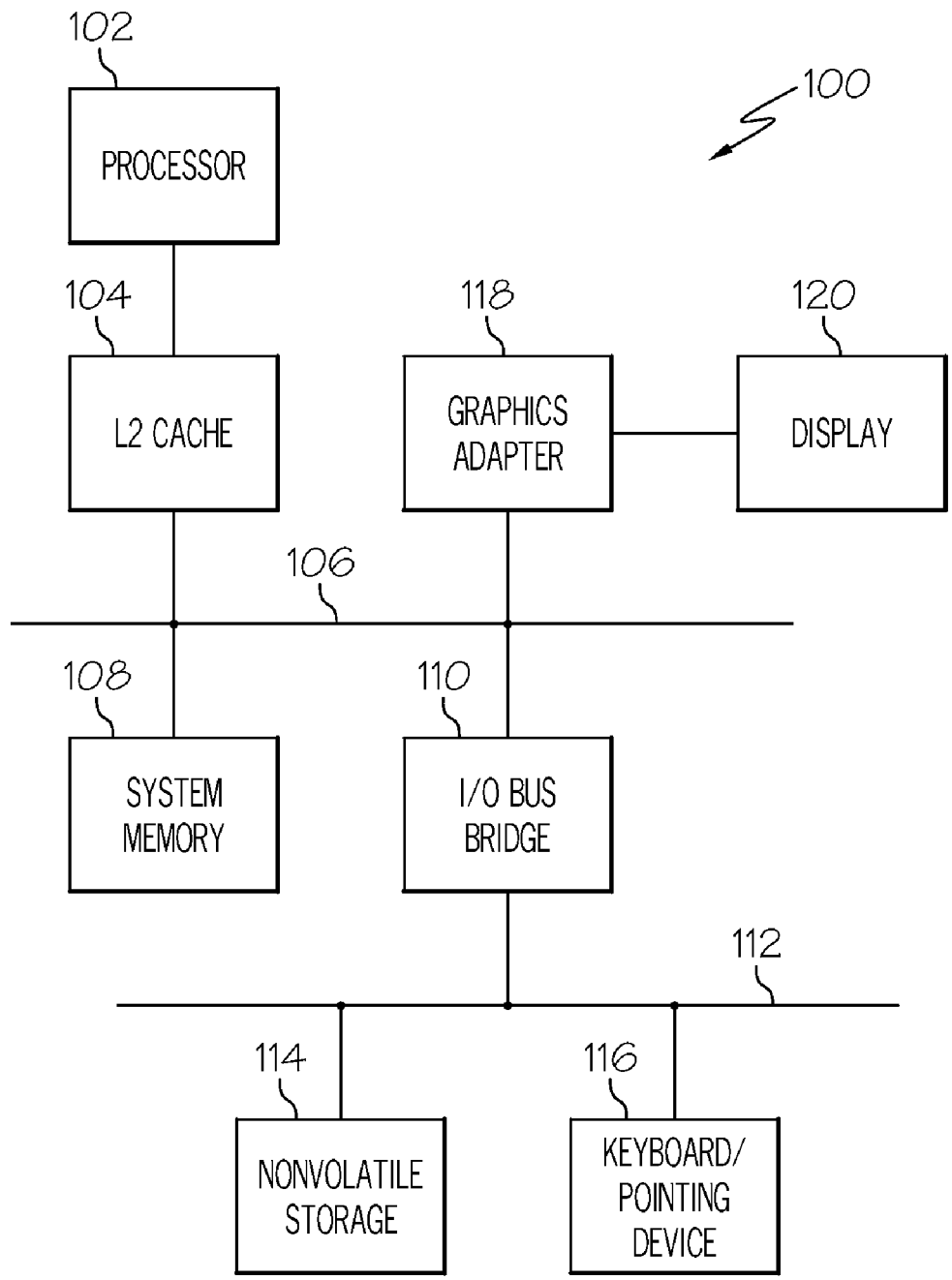
FIG. 1 depicts a block diagram of a computer system in which the present invention may be implemented.

FIG. 1 shows data processing system 100 including system bus 106 to which a level two (L2) cache 104, system memory 108, I/O bus bridge 110 and graphics adapter 118 are operatively connected. The graphics adapter 118 outputs graphics on display 120 to which it is connected. I/O bus bridge 110 is, also, connected to I/O bus 112 which in turn is connected to non volatile storage 114 which may be a hard disk drive, and keyboard/pointing device 116 which may include a conventional mouse, track ball or the like. The I/O bus bridge 110 is provided with logic that controls the receipt and transmission of data to and from any of the devices on the I/O bus 112. The processor 102 is connected to the L2 cache and has access to all devices on the system bus 106. The operating system, software drivers, and application programs are located in the processor. The operating system is, also, termed kernel. As a consequence, both terms are used interchangeably within this document. The application program is positioned on top of the operating system in the memory space of the Processor. The data processing system shown in FIG. 1 is only exemplary and should not be construed, in any way, as a limitation on the scope or spirit of the present invention. As a consequence, one skilled in the art could make adjustments to the system in FIG. 1 or even implement a system with a different structure or architecture and still would be covered by the invention as set forth in the claims.

Figure 2:
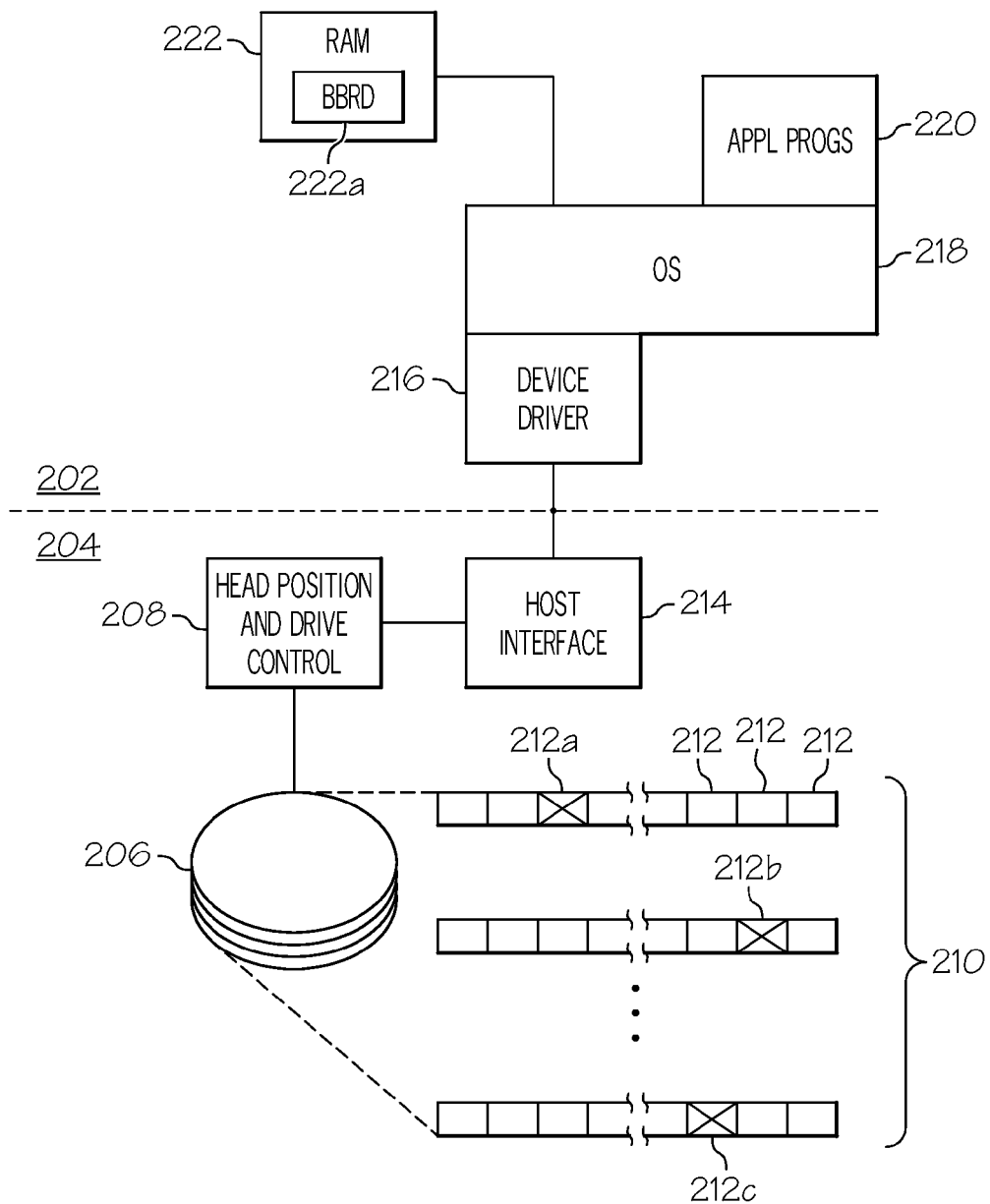
FIG. 2 depicts a graphical representation of a disk drive and components in a host processor that are utilized by the present invention.

FIG. 2 is a diagram of a mechanism used in the relocation of the Bad Block Relocation Directory (BBRD). For purposes of description only and not a limitation on the scope of the present invention the space occupy by the mechanism is partitioned into kernel space 202 and I/O space 204. The mechanism is positioned in kernel space 202 and I/O 204. The portion of the mechanism in kernel space 202 includes device driver 216, operating system (OS) 218, RAM 222, and application programs (APPL PROGS) 220. The RAM 222 may be the system memory 108 depicted in FIG. 1. Portion of RAM 222 is designated to store BBRD 222a. The operating system 218 maintains the BBRD record. The device driver 216, OS 218, and application programs 220 are software which runs in a processor such as processor 102 depicted in FIG. 1.

Still referring to FIG. 2, the disk storage, shown in I/0 space 204, could be the nonvolatile storage 114 depicted in FIG. 1. As will become clearer, it is disks in this disk storage that are formatted according to teachings of the present invention. The disk storage includes storage media 206, which is a computer readable medium and, generally, is made up of a plurality of magnetic storage disks spaced apart along a common central axis. As is well known in this art, data is written to and read from storage media 206 by heads (not shown) positioned relative to storage media 206 as the disks are rotated by a drive motor (not shown). A separate head is associated with each disk within storage media 206. Storage media 206 is logically partitioned into a number of tracks 210, which are generally arranged in concentric circles on the surface of the disks. Each track 210 usually includes servo field containing positioning information used to position the head over a specific track. The servo information and others are not germane to the present invention and are not discussed further in this document. The data portion of each track is divided into a number of data sectors 212 (also referred to as blocks). As will be describe in greater details herein some of the sectors or blocks, such as 212a, 212b, and 212c, are reserved for BBRD. When any of the reserved location is deemed defective the next pre allocated location is used for the BBRD.

Figures 3A, 3B, 3C:
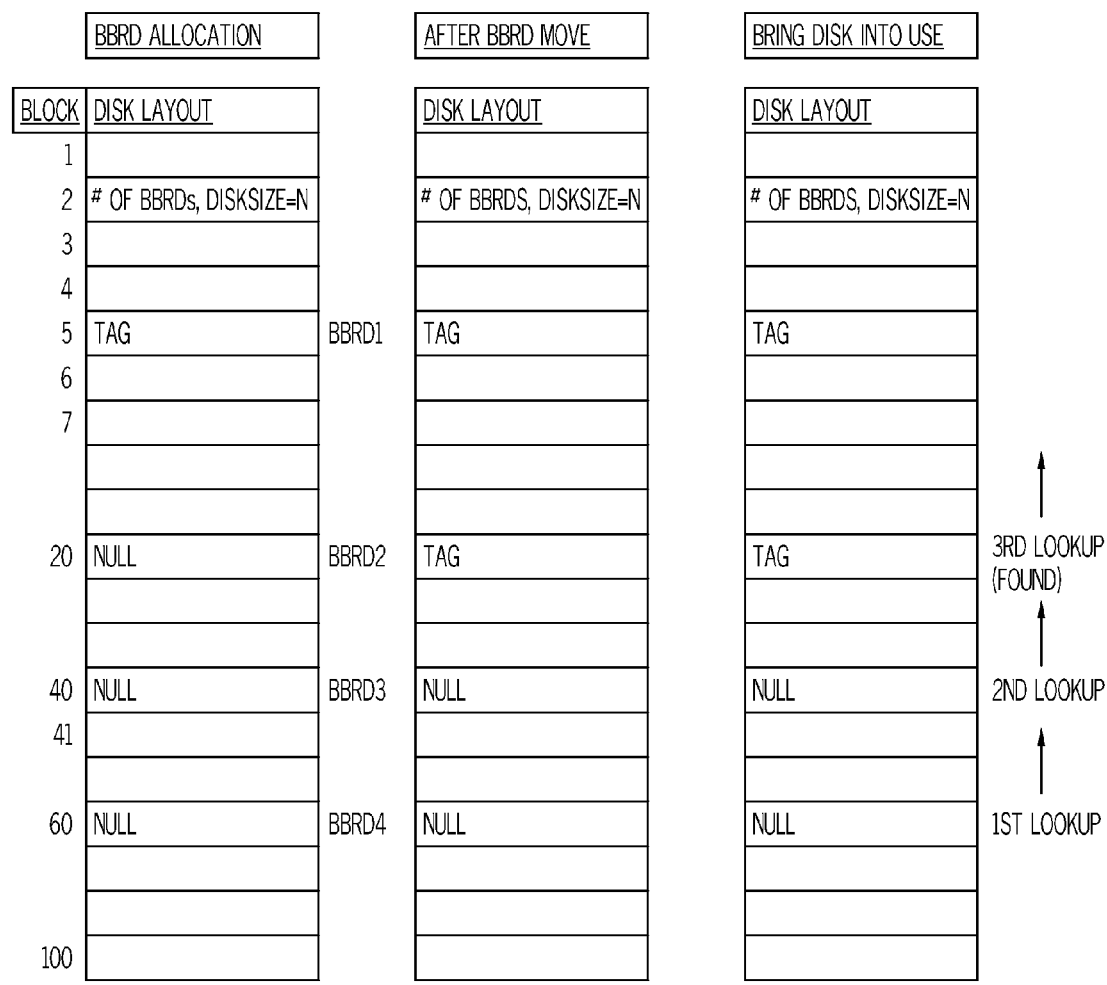
FIGS. 3a, 3b, and 3c, depicts graphical representations for records, according to teachings of the present invention, which are maintained on the disk.

FIG. 3 (including FIG. 3a, FIG. 3b, and FIG. 3c) shows diagrams of an example used to explain the present invention. The diagrams or tables are generated in the kernel, and could be kept on the disk by the Operating System (OS). It should be noted this is only an example used to demonstrate the principles of the present invention and should not be construed as limiting this invention. The diagrams are depicted as tables with each table having two columns. One of the columns is labeled Block and the other is labeled Disk Layout. The block number is written in the column labeled Block and information, such as size of the disk, information for the BBRD etc. are written in the Disk Layout column. It should be noted block numbers are not written on the disk; but the records are.

Referring to FIG. 3a, the table demonstrates formatting of a disk with BBRD allocations. For this example, the disk has m blocks, with m=100. It should be noted m could be any value. Therefore, the number of blocks or other numbers used herein should not be construed as a limiting factor on this invention. The original size n of the disk and BBRD count are entered and retained in block 2. As will be explained subsequently, the size of the disk and BBRD count are retained and are used in an algorithm to determine the number of locations allocated for BBRD. In addition the original size of the disk will be needed to re-calculate the BBRD locations when a disk is brought into use. In this example, blocks 5, 20, 40, 60, and 80 are reserved for BBRD. Here, 5 is the original BBRD location and the rest are alternate locations determined by the algorithm of this invention. Each location is accessed in sequential order when the previous location is deemed defective. In addition, to the allocation of locations for BBRD use, each location is marked with an indicia which indicates the status of the BBRD at that location. In this example, locations that are currently in use or has been used are marked TAG, whereas locations allocated but not used are marked NULL. It should be noted other markings may be used without departing from the scope of the present invention. Preferably, the reserved locations are determined at some time, such as when the disk is formatted or before the disk is used.

FIG. 3b demonstrates the state of the record after a BBRD move. This move would occur because the location at block 5 (FIG. 3a) is deemed defective. The next allocated location is block 20 whereat the BBRD is now in use and is marked TAG. The other locations at block 40 and block 60 are not affected and are still marked NULL.

Figure 4:
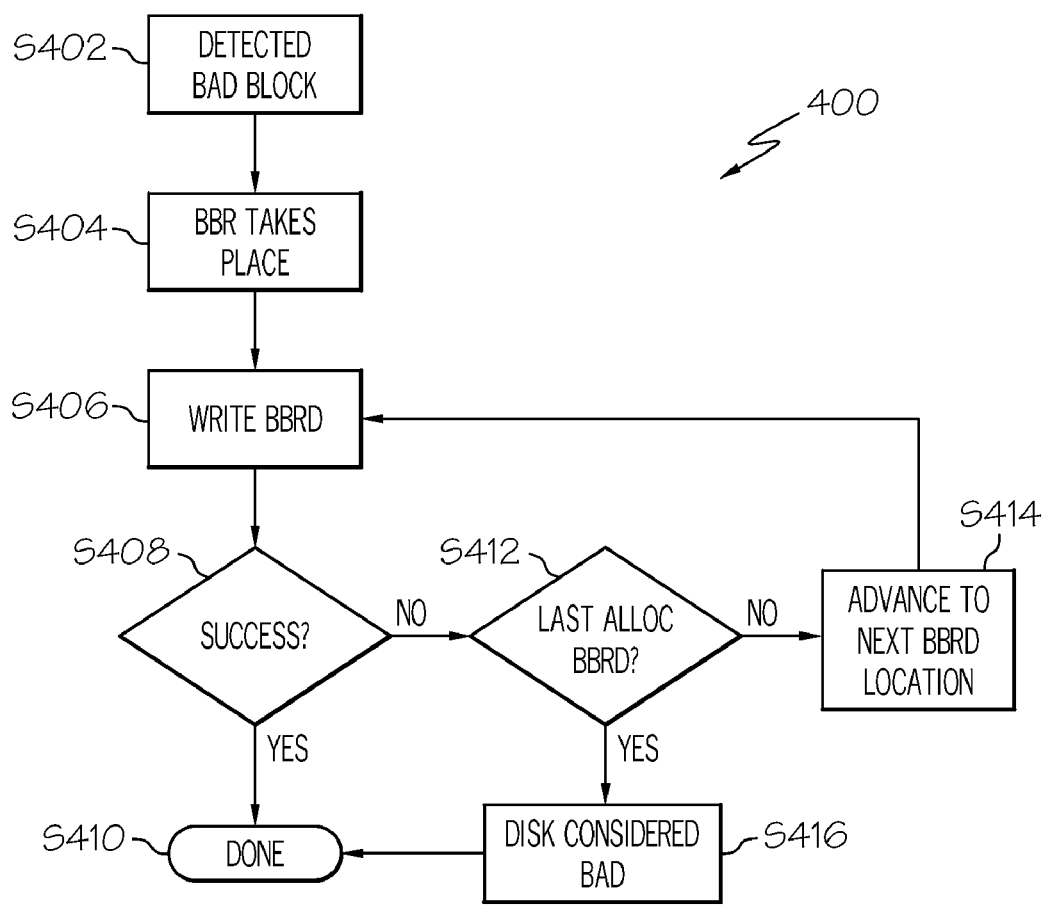
FIG. 4 depicts a high level flow chart of the process used when a bad block is detected on a disk.

FIG. 4 depicts a flow chart 400 of the process when a Bad Block is detected. It should be noted all disk storage devices have mechanisms (not shown) well known in the art to detect and report defective media conditions via host Interface 214 (FIG. 2) to the operating system. The process begins in step (FIG. 2) when the detecting mechanism detects and reports a bad block. The process advances to step S404 whereat BBR takes place. The process then moves to step S406 whereat the BBRD is written on the current location. At step S408, the process determines if the write was a success. If it was, the process ends step S410. If the write was not a success, the process access step S412 whereat it is determined if the location is the last location reserved for maintaining BBRD. If it is, the process concludes that the disk is bad, step S416. The process then ends in step S410. If at step S412 it is determined that this is not the last of the allocated BBRD locations, the process advance to the next allocated BBRD location, step S414, loops to step S406, and practice steps already described. This ends the description of the process as it relates to action taken when a location housing the BBRD is deemed defective.

Referring again to FIG. 3, when a disk is formatted, as shown in FIG. 3a and describe above, it is brought on line for a second time, and FIG. 3c is a table demonstrating the record as it would appear. The task is to find the last used BBRD location. To accomplish this, the locations reserved for BBRD shown in FIG. 3a is recalculated using the original size of the disk, BBRD count, and algorithm used to assign them in FIG. 3a. It should be noted that assigning the BBRD locations in FIG. 3a the assignment is done in ascending order, beginning from low numbered disk locations to high, whereas in FIG. 3c the search to determine the last used BBRD location is conducted in reversed order (i.e. from high numbered disk locations to low). With reference to FIG. 3c, the last BBRD location at Block 60 is read first. A check is made to see if the indicia associated with the presence of BBRD is present. For the example, in FIG. 3 the indicium is termed TAG. If the TAG is not there, then the next BBRD location (40) is read. The process is repeated until a BBRD area is located which has a TAG indicating the last presence of the BBRD. This is the last BBRD area that was updated and is read into RAM 222 (FIG. 2).

Figure 5:
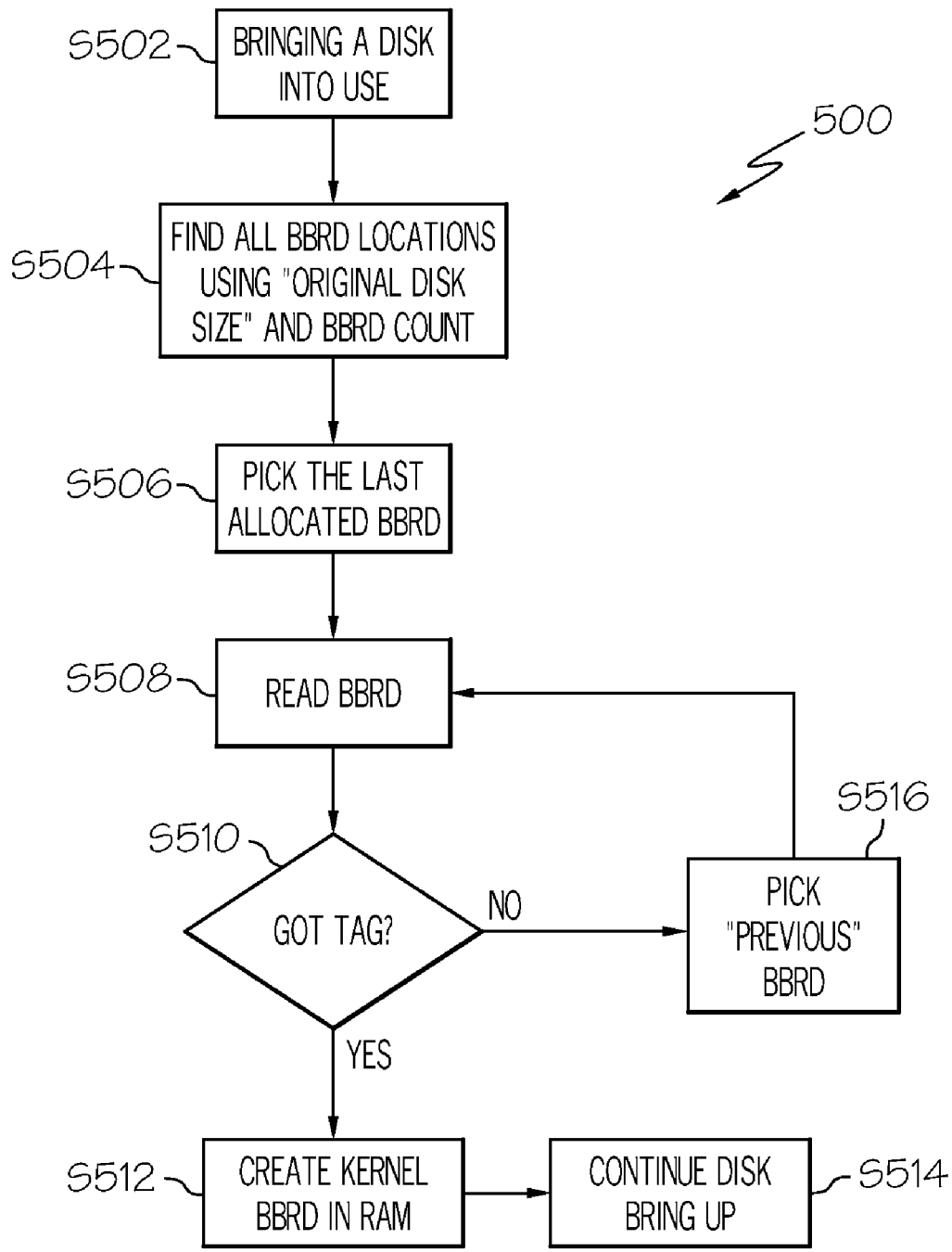
FIG. 5 depicts a high level flow chart of the process used when a disk is brought on line.

FIG. 5 depicts a flow chart 500 of the process when a disk is brought into use. The process begins at step S502 by bringing the disk into use. The process then advance to step S504 whereat the locations reserved for BBRD is recalculated (FIG. 3c) using original disk size and BBRD count. The search for the last updated BBRD begins by selecting the last allocated BBRD location, step S506, and labeled as first lookup (FIG. 3c). The process then descends into step S508 whereat the BBRD is read. At step S510, it is determined if TAG is present in the BBRD read in step S508. If it is, the process accesses step S512 wherein a copy of the BBRD 222a is created in RAM 222 (FIG. 2). By so doing the kernel or operating system has access to the latest updated version of the BBRD. The process then enters step S514 whereat disk bring up continues. If at step S510 no TAG was found with the BBRD read in step S508, the process enters step S516, picks the next BBRD location, loops, and performs the process steps previously described. This ends the description of the process explaining what happens when a disk is brought into use.

Figure 6A:
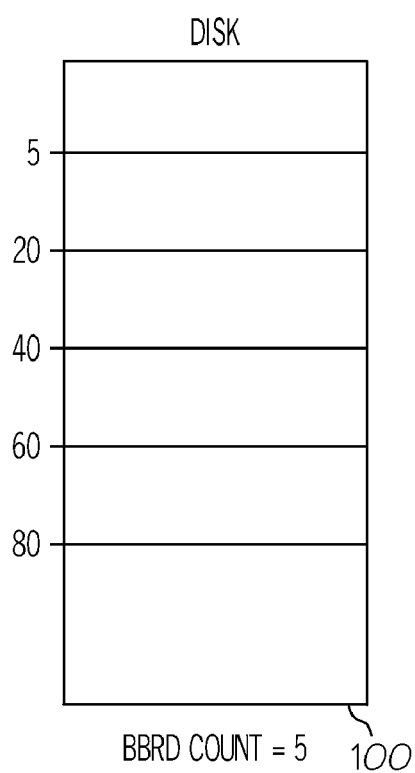
FIG. 6A and FIG. 6B, depicts a graphical representation of the process or algorithm used to allocate locations for BBRD on a disk.
Figure 6B:
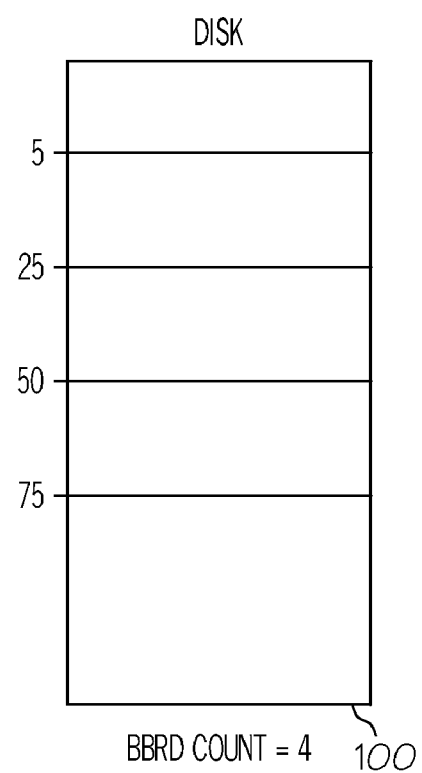

FIG. 6, including FIG. 6A and FIG. 6B, depicts a graphical representation of the process which determines the location reserved for BBRD. Simply put, the algorithm for determining the locations for BBRD on a disk may be stated as follows: M divided by N, wherein M represents the size of the disk, and N represents the number of locations, term BBRD count, that the user wishes to have on the disk. For example, in FIG. 6A the BBRD count is set to 5, and the disk size is 100 blocks. The default position on the disk is at location 5. Using the algorithm, M is set to 100, whereas N is set to 5. Therefore, the alternate locations for BBRD are 20 blocks apart, as shown in FIG. 6A, at 20, 40, 60, and 80. In FIG. 6B, the same disk of 100 blocks is partitioned into locations for BBRD with a BBRD count of 4. In this example, the default position is still at block 5 but the alternate locations for BBRD are twenty-five blocks apart at 25, 50, and 75. These examples are specific and are use only to explain the invention in a manner that is less complicated. As a consequence, they should not be construed as a limitation on the scope of the invention. In order to demonstrate that the examples do not limit the scope of the invention a more general description of the algorithm and process are set forth herein.

The algorithm for finding the locations and number of BBRDs on the disk uses user selected configurable parameter, term BBRD count. The BBRD count has a value of X which is set to 5 by default. It can also be viewed as a tolerance of the system administrator before a disk is marked bad. The parameter value can only be set to a value greater than 1 (that is 2 or more). When the disk is brought into use, the size of the disk is divided by the BBRD count. This gives the location of alternate blocks that will be used for BBRDs. The first BBRD location is not moved. For example, on a 100 block disk (such as the disk shown in FIG.6A, and discussed above) with a BBRD count of 5 the 4 alternate BBRDs would be locations at blocks 20, 40, 60, and 80. If the same disk was used with a BBRD count of 4, the 3 alternates would be located at blocks 25, 50, and 75. It is clear that the plurality of locations for the BBRD is dispersed on or throughout the disk with no two locations being in contiguous blocks of the disk.

One aspect of this invention is to notify the administrator when the disk is deemed going bad. To achieve this end, a threshold set to BBRD count minus 1 could be used. As described herein, successive BBRDs are used when a previous BBRD is deemed bad. As a consequence, an alternate threshold could be set to notify the administrator during the use of the last BBRD. In either case corrective action can be taken by the administrator.

While the invention has been particularly shown and described with reference to an embodiment it will be understood by those skilled in the art that various changes in form and details may be made therein without departing from the spirit and scope of the present invention.

What is claimed is:

1. A method for relocating Bad Block Relocation Directory (BBRD), comprising:
   providing a disk;
   allocating a plurality of locations on said disk for carrying the BBRD;
   storing the BBRD in one of the plurality of locations;
   determining that a media on the disk whereat the BBRD is located is defective;
   selecting another one of the plurality of locations on said disk to house the BBRD;
   determining if the media at the selected location is defective; and
   relocating the entire BBRD to the selected location only if the media at the selected location is not defective.

2. The method of claim 1 further including selecting the plurality of locations based on the size of the disk divided by a value representing a number of locations reserved for BBRB on said disk.

3. The method of claim 1 further including dispersing the plurality of locations within different areas of the disk, with no two locations being in contiguous blocks of said disk.

4. The method of claim 1 further including selecting the plurality of locations in ascending sequential order on the disk, beginning from low numbered blocks to high numbered blocks.

5. The method of claim 1 further including marking the selected one of the plurality of locations whereat the BBRD is being stored with a first indicia indicating presence of said BBRD.

6. The method of claim 5 including marking other ones of the plurality of locations not containing the BBRD with a second indicia indicating absence of the BBRD in the other ones of the plurality of locations.

7. The method of claim 6 wherein the first indicia and second indicia are different.

8. The method of claim 1 further including if the selected location is defective selecting a next location in sequence;
   determining if the next location in sequence is defective; and
   repeating the acts of selecting and determining next location until the number of the plurality of locations is exhausted or a non defective location is found.

9. The method of claim 8 further including marking the disk bad and discontinue further I/O activities to said disk only if the number of the plurality of locations are exhausted.

10. A method for relocating a Bad Block Relocation Directory (BBRD), comprising:
    allocating a plurality of locations on a disk storage for carrying the BBRD;
    storing the BBRD in one of the plurality of locations;
    determining that a media whereat the BBRD is located is defective;
    selecting another one of the plurality of locations to house the BBRD;
    determining if the media at the selected location is defective;
    relocating the BBRD to the selected location only if the media at the selected location is not defective;
    releasing the disk to a group of disks;
    recalculating locations reserved for BBRD based on original disk size and BBRD count;
    storing the recalculations in a recalculated record;
    starting with the BBRD area located at the highest block number, searching the recalculated record backwards until a BBRD area is detected including a predefined indicia; and
    creating, in a RAM located with an operating system to which the disk is coupled, a copy of the BBRD found at the BBRD area marked with the predefined indicia.

11. A system for relocating Bad Block Relocation Directory (BBRD) comprising:
    a memory;
    a BBRD stored in said memory;
    a processor operatively coupled to said memory and generating a first record for at least one disk in a disk device, said processor executing a process that reserves a plurality of locations on said at least one disk for the BBRD, selecting one of the locations so reserved for placing the stored BBRD, marking the selected location with a first indicia, and marking reserved locations not containing the BBRD with a second indicia; and
    a driver operatively coupled to the processor for forwarding said first record.

12. The system of claim 11 including an operating system for said processor, upon receiving an error signal, in the operating system of said processor, indicating the media at the location of the disk whereat the BBRD is stored is defective, relocating the entire BBRD from the defective location to a non defective one of the plurality of locations reserved for the BBRD.

13. The system of claim 12 wherein the non defective location is selected by sequentially searching the locations reserve for the BBRD, beginning at a location next in sequence to the defective one and continues until the non defective location is found.

14. The system of claim 12 further including a register coupled to the operating system, said operating system setting a value in said register wherein said value represents a threshold indicating many areas of the disk is defective and the disk needs replacement; and
generating a signal indicating that the disk is defective when a pre defined number of BBRD locations used equals the value set in said register minus 1.

15. The system of claim 11 further including when the plurality of locations reserved for the BBRD are used mark the disk bad and stop all I/O activities to the disk.

16. The system of claim 11 including the disk storage device operatively coupled to the driver, said disk storage device including a host interface device for receiving and storing the first record.

17. A system for relocating Bad Block Relocation Directory (BBRD) comprising:
a memory;
a BBRD stored in said memory;
a processor operatively coupled to said memory and generating a first record for at least one disk in a disk device, said processor executing a process that reserves a number of locations on said at least one disk for the BBRD, selecting one of the locations so reserved for placing the stored BBRD, marking the selected location with a first indicia, and marking reserved locations not containing the BBRD with a second indicia;
a driver operatively coupled to the processor for forwarding said record, wherein said processor zero out said first record;
obtaining an original disk size and BBRD count; and
using the original disk size and BBRD count to recalculate a second record, wherein said second record includes all BBRD locations calculated in the first record.

18. The system of claim 17 further including searching the second record to determine the location whereat the BBRD was last stored.

19. A computer program product for use in a computer to relocate a BBRD comprising:
a tangible computer readable medium having a computer readable program embedded therein, said computer program including instructions which format a disk storage to reserve a plurality of locations on said disk for the BBRD;
instructions for marking at least one location whereat the BBRD is located with a first indicia;
instructions for marking a second indicia at other locations reserved for the BBRD but not yet in use; and
instructions for placing the BBRD at the at least one location; wherein the plurality of locations are being determined from an expression M divided by N where M represents size of the disk, and N represents a value indicating the plurality of locations on the disk.

20. The computer program product of claim 19 including instructions, responsive to an error signal indicating defective media at the location whereat the BBRD is located, for searching the other locations reserved for the BBRD beginning at a location next in sequence to the defective location until a good location is found; and
instructions for relocating the entire BBRD to the good location.

* * * * *